United States Patent [19]

Kimura

[11] 4,356,601
[45] Nov. 2, 1982

[54] PLASTIC FASTENER

[75] Inventor: Shigeru Kimura, Kamakura, Japan

[73] Assignee: Nifco Inc., Yokohama, Japan

[21] Appl. No.: 167,128

[22] Filed: Jul. 9, 1980

[30] Foreign Application Priority Data

Jul. 16, 1979 [JP] Japan .............................. 54-96748[U]

[51] Int. Cl.³ ....................... F16B 19/00; A44B 17/00
[52] U.S. Cl. ....................................... 24/297; 24/214; 411/508
[58] Field of Search ............... 411/508, 509, 500, 907, 411/908; 24/73 AP, 73 PF, 73 P, 73 PM, 297, 214, 213 R

[56] References Cited

U.S. PATENT DOCUMENTS

| | | | |
|---|---|---|---|
| 3,776,092 | 12/1973 | Seckerson | 411/509 |
| 4,011,770 | 3/1977 | Webb | 24/73 AP X |
| 4,094,483 | 6/1978 | Busch | 24/73 AP X |
| 4,114,339 | 9/1978 | Ito | 24/214 X |

FOREIGN PATENT DOCUMENTS 1464882 11/1966 France .............................. 24/73 AP

*Primary Examiner*—Ramon S. Britts
*Attorney, Agent, or Firm*—Trexler, Bushnell & Wolters, Ltd.

[57] ABSTRACT

Disclosed is a plastic fastener which comprises one or more protective frames having a profile suitable for substantially intimate insertion into matched openings formed in a given basal object and as many fixing legs formed within the empty spaces enclosed with the protective frames and provided with engaging claws for fast engagement with the edges of the openings in the basal objects. When the fastener is attached to the basal object by the cooperation of the fixing legs and their respective protective frames, the protective frames bring about a reinforcing effect and add greatly to the fastness of the engagement between the fastener and the basal object.

5 Claims, 4 Drawing Figures

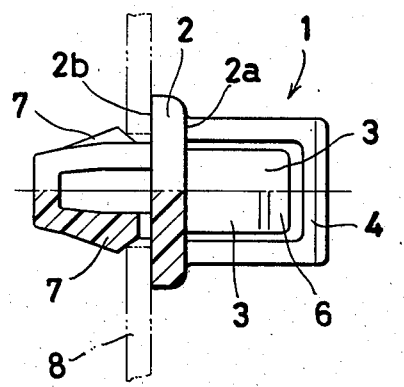
Fig_1
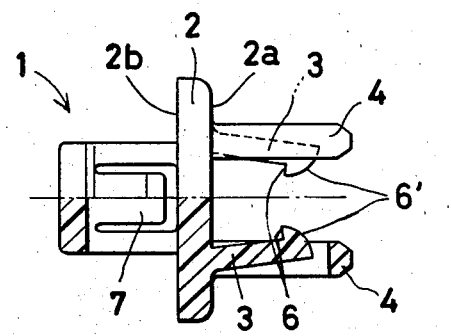
Fig_2
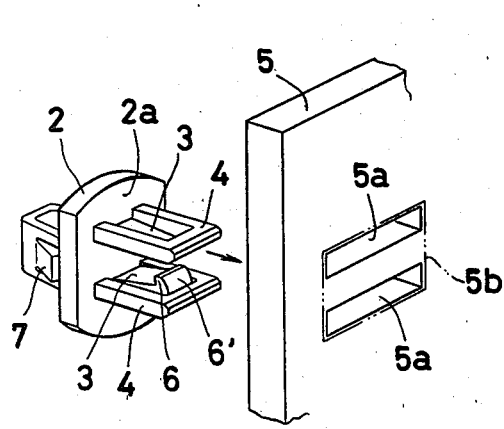
Fig_3
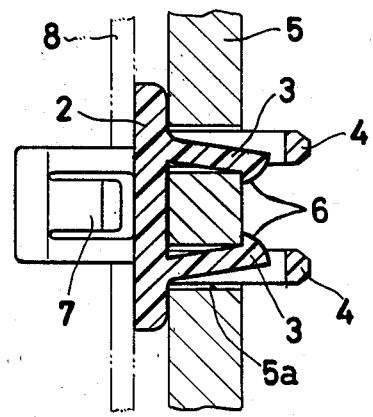
Fig_4

PLASTIC FASTENER

BACKGROUND OF THE INVENTION

This invention relates to a plastic fastener possessing fixing legs adapted to be inserted into matched holes bored in advance in a basal object to which the fastener is to be firmly attached, and particularly to a plastic fastener so constructed as to protect the fixing legs, while in a state inserted in the holes, against an external force tending to inflict breakage upon the legs and, therefore, totally eliminate the possibility of the fixing legs being accidentally released from the basal object.

Various methods have been proposed for effecting simple union of two given objects. Particularly where the objects given to be joined are in the shape of panels, fasteners of the type having hook-shaped engaging claws provided one each at the opposite ends thereof are widely adopted. With these fasteners, the union of panels is accomplished by a procedure of inserting their engaging claws into the holes bored in advance at the corresponding positions in the opposed panels and then bringing them into fast engagement with the edges of the holes. This particular method of panel fastening enjoys a characteristic advantage that the two panels can be securely joined by such simple work as described above and the engagement, once completed with a snapping motion between the fasteners and the panels, can easily be broken whenever required. On the other hand, however, these fasteners have a disadvantage that while the snapping engagement to be obtained by their engaging claws relies to a great extent upon the elasticity possessed by the plastic material of which the fasteners are made, it has been impracticable to give the engaging portions of the fastener strength enough to provide the elasticity needed for such snapping engagement. Because of the lack of ample elasticity, there has been a possibility that, even under a slight external force, the engaging portions will sustain breakage and the fasteners themselves will accidentally come off the objects being joined therewith.

The fasteners of this type have been adopted for fastening automobile parts and have contributed much to the enhancement of the efficiency of the work of automobile assemblage. For the reason stated above, however, they have had the drawback of easily sustaining damage from impacts and vibration. Now, the fasteners will be described below as applied to the fastening of radiator grilles to automobile bodies, a particularly convenient use found for the fasteners. Since the union between the fastener and the automobile body is not restricted from the viewpoint of appearance, the engaging portions of such fasteners may be so constructed as to give them as much strength as desired. In the case of the union between the fastener and the radiator grille, however, the engaging portion of the fastener destined to come into direct engagement with the radiator grille is required to be constructed in as small a size as permissible to make it unobtrusive and to permit its easy release from engagement. The engaging portion, therefore, is not allowed to acquire the degree of strength necessary to give it the elasticity required. Since the engaging portion of the fastener on the radiator grille side is vulnerable to stress owing to its deficient strength, there are times when the fastener accidentally breaks on their radiator grille side and releases the radiator grille from its engagement with the automobile body.

SUMMARY OF THE INVENTION

An object of this invention is to provide a plastic fastener possessing a construction which enables objects to be mutually united with force enough to withstand large external forces exerted thereon and to be released from their mutual union with ease and which further offers high breaking strength under a load applied externally.

To accomplish the object described above according to the present invention, there is provided a plastic fastener which comprises at least one fixing leg provided at the free end thereof with an engaging claw adapted to come into fast engagement with the edge of an opening formed in advance in a basal object to which the fastener is to be attached and a protective frame formed to encircle each fixing leg.

The protective frame has a profile suitable for substantially intimate insertion into the opening formed in the basal object. The fixing leg is adapted to be completely embraced within the overall boundary of the protective frame, and the engaging claw formed at the free end thereof alone is allowed, while in its natural state, to protrude from the overall boundary of the protective frame. While the fastener is in the process of entering into engagement with the basal object, the fixing leg is bent down until the engaging claw is completely retracted into the overall boundary mentioned above, so that the protective frame and the fixing leg are allowed to be pushed into the opening in the basal object. After the engaging claw has slid past the entire thickness of the opening, it springs back to its original protruding position and consequently comes into fast engagement with the edge of the opening on the other side of the basal object, completing the desired attachment of the fastener to the basal object. While the fastening is secured by the cooperation of the engaging claw and the fixing leg, the protective frame fulfills a major role in resisting the stress exerted upon the lateral sides of the fixing leg.

The other objects and characteristics of this invention will become apparent from the further disclosure of the invention to be made hereinafter with reference to the accompanying drawing.

BRIEF EXPLANATION OF THE DRAWING

FIG. 1 is a partially sectioned front view illustrating one embodiment of the plastic fastener of the present invention.

FIG. 2 is a partially sectioned side view of the same plastic fastener.

FIG. 3 is a perspective view of the plastic fastener as readied for attachment to a basal object.

FIG. 4 is a longitudinal cross section of the plastic fastener attached fast to the basal object.

DESCRIPTION OF THE PREFERRED EMBODIMENT

This invention relates to a plastic fastener, comprising a fixing leg provided with an engaging claw adapted to be forced through an opening formed in the basal object and brought into fast engagement with the edge of the opening on the other side of the object and a reinforcing protective frame formed to encircle the fixing leg and enhance the fastness of the engagement of the fastener to the basal object.

Now, the present invention will be described with reference to the illustrated embodiment. The fastener 1 of this invention comprises a support plate 2, a pair of fixing legs 3 projecting from the fixing surface 2a of the support plate 2 opposed to the basal object and protective frames 4 enclosing the lateral sides and free ends of the respective fixing legs. It is integrally molded of a plastic material possessing a suitable degree of elasticity. Since the profile of each fixing leg is a rectangle having one side thereof continue into the fixing surface 2a, the corresponding protective frame has an angular U-shaped outline somewhat larger than the profile of the fixing leg. The protective frame may be formed in any desired shape on condition that it is capable of embracing the lateral sides and the free end of the fixing leg.

In the basal object 5, there are formed openings for admitting the pair of fixing legs 5 and their respective protective frames 4. These openings are required to be large enough for admitting the protective frames into substantially intimate engagement therewith.

In the present embodiment, the fixing legs 3 possess engaging claws 6 protruding from the opposed surfaces of their respective free ends, so that the engaging claws 6 of the fixing legs come into fast engagement with the edges of the openings on the opposite side of the basal object after the fixing legs and their protective frames have been inserted into the openings until the fixing surface 2a of the support plate collides with the surface of the basal object. It is, therefore, the minimum requirement that at least the engaging claws 6 should protrude from the overall boundaries of the protective frames 4. In the present embodiment, the fixing legs 3 are extended in mutually approaching directions from the fixing surface 2a of the support plate, whereas the protective frames are extended in substantially parallel directions from the same fixing surface 2a. It is naturally permissible that the fixing legs be extended in parallel directions from the support plate similarly to the protective frames and only the engaging claws be allowed to protrude from the overall boundaries of the protective frames. At the leading ends of the engaging claws 6 protruding from the overall boundaries of the protective frames, there are formed cam faces 6' which are inclined in a straight or curved line in the direction of the engaging claws, so that the engaging claws 6 are allowed to slide into the openings instead of colliding with the edges of the openings while the fastener is being attached to the basal object.

When the fixing legs and their respective protective frames are inserted into the openings 5, therefore, the engaging claws are pushed back by the edges of the openings and the fixing legs are consequently bent down. After the fixing surface 2a of the support plate has collided with the surface of the basal object, the fixing legs spring back to their original shapes and the engaging claws come into fast engagement with the edges of the openings on the opposite side of the basal object, completing the desired attachment of the fastener to the basal object. Since not merely the fixing legs but also the protective frames encircling the fixing legs are passed through the openings, the fixing legs are protected by the protective frames. Even when an external force tending to break the fixing legs is exerted upon the fastener, the protective frames offer resistance to the force. Compared with the conventional fastener which has only its fixing legs inserted in the openings, the fastener of this invention remains fast on the object and has absolutely no possibility of coming off the object owing to damage to its fixing legs. Moreover, since the protective frames 4 concurrently serve to facilitate the positioning of the fastener relative to the openings 5 and guide the fixing legs through the openings, the fastener enjoys ease of fixing work compared with the conventional fastener which has only its legs inserted in the openings.

Further in the present embodiment, the fastener already attached to the basal object can be removed from the object after the fast engagement of the engaging claws with the edges of the opening is broken by inserting a tool such as a screw driver from behind the basal object between the engaging claws 6 of the fixing legs 3 and turning it about its axis thereby pushing the engaging claws outwardly in their mutually separating directions.

Optionally, the engaging claws may be formed on the farther sides of the fixing legs at their respective free ends so as to protrude from the outermost sides of the respective protective frames. In this case, there may be formed in the basal object just one opening 5b which, as shown by the chain line in FIG. 3, is only required to be large enough to admit simultaneously the two pairs each of a fixing leg and a protective frame.

In the present embodiment, the support plate 2 is further provided on the surface 2b opposite the fixing surface 2a with another fixing portion 7. This fastener is effectively used in fastening a radiator grille to an automobile body. Specifically, the pairs of fixing legs and their respective protective frames serve to attach the fastener to the radiator grille and the fixing portion 7 serves to fasten the radiator grille to another object such as the automobile body panel. This additional fixing portion 7 is not necessarily limited to means for attachment to a panel-like object as illustrated in the drawing. It may be in any other form fit for a particular use. A hook adapted to retain an electric cable, frame-shaped means and belt-shaped means adapted to bind an electric cable are typical examples. The fastener is conveniently used also for the purpose of fastening a plurality of panels in a layered manner.

The present invention has been described with reference to one illustrated embodiment incorporating two pairs of fixing legs and protective frames. The number of such pairs is not limited to two. It may be one or three or more to suit the occasion.

What is claimed is:

1. A plastic fastener adapted for insertion through one or a pair of openings in a basal object and comprising in combination: a support plate; a pair of spaced apart fixing legs integrally molded with said support plate so as to protrude from one surface of said support plate, each said fixing leg being provided on the free end thereof with a laterally protruding engaging claw; a pair of protecting frames provided integrally on said support plate, each frame having frame side portions extending from the support plate and a frame end portion connecting the frame side portions at the free ends thereof embracing the two sides and the free end of one of said fixing legs; said engaging claws protruding from the open surfaces of said protective frames; said protective frames having the frame end portions entirely spaced from each other at the free ends of the frames adapting the same for insertion through one or a pair of openings in a given basal object and the respective fixing legs being sufficiently elastic to yield during insertion, and thereafter said laterally protruding engaging claws grippingly engaging respective adjacent edges of said opening; said protective frames preventing said engaging claws from releasing their engagement with the adjacent edges of the opening due to any external forces applied to said fastener.

2. The plastic fastener according to claim 1 wherein the engaging claws protrude inwardly so as to be mutually facing and wherein the adjacent edges of two openings are engaged thereby, each in alignment with one of said protective frames.

3. The plastic fastener according to claim 1 or claim 2, wherein said support plate is provided on the other surface thereof with second fixing means adapted for fast engagement with another object.

4. The plastic fastener according to claim 1 or claim 2, wherein each said engaging claw has a curved cam face formed at the leading end thereof which protrudes from the open surface of said protective frame to encourage said yielding of said fixing legs during insertion.

5. The plastic fastener according to claim 1 or claim 2, wherein each said protective frame is shaped in a size fit for substantially intimate insertion into one of said openings in said basal object.

* * * * *